July 1, 1924.

C. BUSH 1,499,970

PILOT REAMER

Filed Oct. 30, 1922

Inventor
Clarence Bush,

WITNESSES:-

By

Attorney

Patented July 1, 1924.

1,499,970

UNITED STATES PATENT OFFICE.

CLARENCE BUSH, OF CHICAGO, ILLINOIS.

PILOT REAMER.

Application filed October 30, 1922. Serial No. 597,956.

*To all whom it may concern:*

Be it known that I, CLARENCE BUSH, citizen of the United States, residing at Chicago, in the county of Cook and State of Illinois, have invented certain new and useful Improvements in Pilot Reamers, of which the following is a specification.

This invention relates to dental tools, and more particularly to a special instrument for enlarging the natural root canal of a tooth.

A primary object of the invention is to provide a reamer having a pliot portion which guides the reamer in the proper course to follow the natural canal, thereby avoiding damage to the root itself and also preventing enlargement of the extreme end of the root canal. That is to say, the present invention has in view a tool of the reamer type having a pilot end which acts as a path-finder in the obscured root canal, whereby due to the flexibility of the pilot and the drill shank, the reamer may assume a proper working curvature in gaining access to the canal and avoid the projecting corners of the tooth crown.

A further object of the invention is to provide a simple and practical tool which may be readily made, and which is capable of being used in connection with standard dental equipment, and also, the pilot of which may be made in various lengths on different tools thereby enabling the dentist to select a tool having a pilot of the length of the root canal of the particular tooth being worked on.

With the above and other objects in view which will more readily appear as the nature of the invention is better understood, the same consists in the novel construction, combination, and arrangement of parts, hereinafter more fully described, illustrated and claimed.

A preferred and practical embodiment of the invention is shown in the accompanying drawings, in which :—

Similar reference characters designate corresponding parts throughout the several figures of the drawings.

Figure 1:
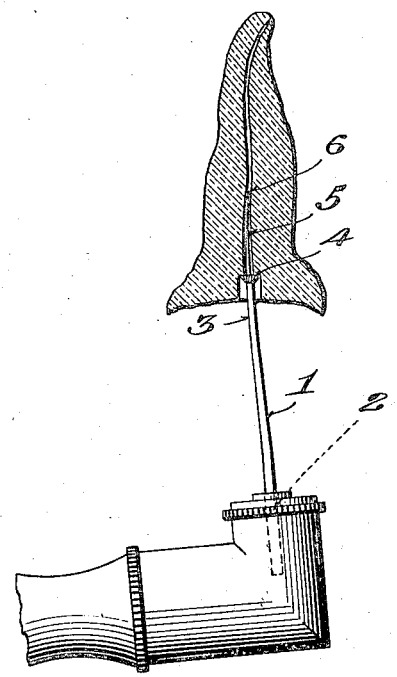
Figure 1 is a detail view illustrating the application of the invention.

One of the novel and distinctive features of the present invention is to provide a tool which will permit of the uniform enlargement of the root canal of a tooth without danger of the reamer portion thereof running off center and thereby perforating the side of the root. In applying certain types of artificial teeth it is of course necessary to properly prepare the root canal and owing to the obscure and rather difficult position thereof much skill is required in the proper use of the reamer, as well as accurate knowledge of the character of the root canal. Even then, however, it is desirable to have some reliable means to assist in properly enlarging the canal without damaging the sides of the root, and at the same time preventing the reamer from passing entirely through to the end of the canal and penetrating the apex of the tooth.

Accordingly, the present invention proposes to provide a novel tool consisting of a flexible body 1 having the shank portion 2 for engaging with the chuck of the standard dental engine equipment, while the opposite end of the body is tapered as indicated at 3 and is formed with the reamer portion or burr 4. Beyond this reamer portion 4 the end of the body is formed with a relatively delicate and adequately flexible pilot portion 5 whose point is very sharp, and whose length may vary from $\frac{1}{64}$th of an inch to about $\frac{1}{2}$ of an inch on different instruments, according to the length of root canals to be worked upon.

As previously stated the pilot portion 5 is relatively flexible and the body 1 is very flexible so as to easily follow the root canal and permit the tool to readily assume the proper working curvature in entering the tooth. As the pilot 5 enters the root canal by reason of its relatively small diameter, and therefore greater flexibility, it easily follows the root canal and reaches or guides the reamer portion 4 along the proper path for effecting adequate enlargement of the canal. In the use of the tool it will be apparent that immediately upon the point 6 piercing the apex of the tooth the patient will feel sensation and thus warn the operator that the drill has penetrated to the proper distance in the tooth. In that way the flexible pilot portion acts as a gauge so that the enlargement of the root canal entirely to the apex of the tooth, which is unnecessary, is avoided.

The pilot portion 5 of the reamer is preferably formed integrally with the body of the tool and is therefore turned out and ground from the same piece of stock.

Figure 2:
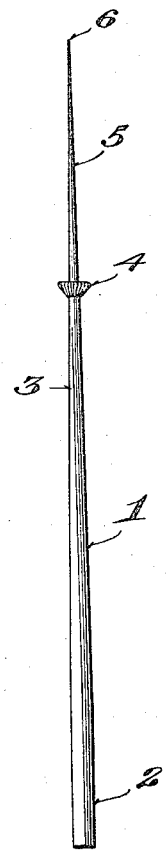
Figure 2 is an elevation of my improved tool on an enlarged scale.

The use of the invention is clearly illustrated in Figure 2 of the drawings from which it will be observed that the pilot 5 follows the course of the canal C in the root R of the tooth and enables the reamer 4 to form the proper enlargement thereof as indicated at C'.

Without further description it is thought that the many features and advantages of the invention will be readily apparent to those skilled in the art, and it will of course be understod that suitable changes may be resorted to within the scope of the appended claims.

I claim:—

1. A dental reamer including a body having a flexible tip constituting a pilot adapted to follow the natural tooth canal, and a reamer burr formed on the body at the rear of the flexible tip.

2. A dental reamer including a body having a reamer portion and an integral tapering flexible pilot arranged in advance of the reamer, said flexible pilot portion also acting as a depth gauge for the reamer.

In testimony whereof I hereunto affix my signature.

CLARENCE BUSH.